United States Patent
Stumpff

[19]

[11] Patent Number: 6,119,857
[45] Date of Patent: Sep. 19, 2000

[54] HINGE

[76] Inventor: David Stumpff, 4955 Walnut Grove, Alpharetta, Ga. 30022

[21] Appl. No.: 09/199,516

[22] Filed: Nov. 25, 1998

[51] Int. Cl.[7] .......................... B65D 85/30; B65D 85/57; B65D 6/28; B65D 43/14; B65D 51/04
[52] U.S. Cl. ...................... 206/308.1; 220/836; 220/840; 220/4.23
[58] Field of Search ................................ 206/308.1, 309, 206/310, 312; 220/836, 840, 842, 4.22, 4.23

[56] References Cited

U.S. PATENT DOCUMENTS

| | | | |
|---|---|---|---|
| 4,211,337 | 7/1980 | Weavers et al. | 220/840 |
| 4,397,389 | 8/1983 | Findeisen | 220/840 |
| 4,750,611 | 6/1988 | Morrone | 206/309 |
| 4,793,480 | 12/1988 | Gelardi et al. | 206/312 |
| 5,213,229 | 5/1993 | Taniyama | 220/4.23 |
| 5,238,106 | 8/1993 | Nguyen et al. | 206/223 |
| 5,392,906 | 2/1995 | Taniyama | 206/311 |
| 5,495,940 | 3/1996 | Taniyama | 206/308.1 |
| 5,573,120 | 11/1996 | Kaufman et al. | 206/308.1 |
| 5,890,590 | 4/1999 | Doodson | 206/308.1 |
| 5,938,021 | 8/1999 | Grobecker | 206/308.1 |

*Primary Examiner*—Paul T. Sewell
*Assistant Examiner*—Anthony Stashick
*Attorney, Agent, or Firm*—Troutman Sanders LLP; Wm. Brook Lafferty, Esq.

[57] ABSTRACT

An improved hinge with primary application to plastic molded containers. More particularly, this invention relates to a hinge which is compliant to bending forces applied during assembly and use of a container having a cover and a base. Importantly, the improved hinge limits the amount that the hinge may be bent.

13 Claims, 3 Drawing Sheets

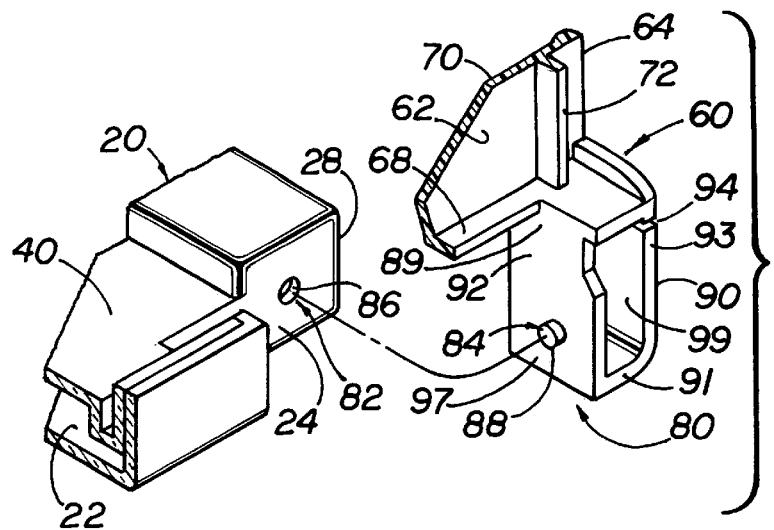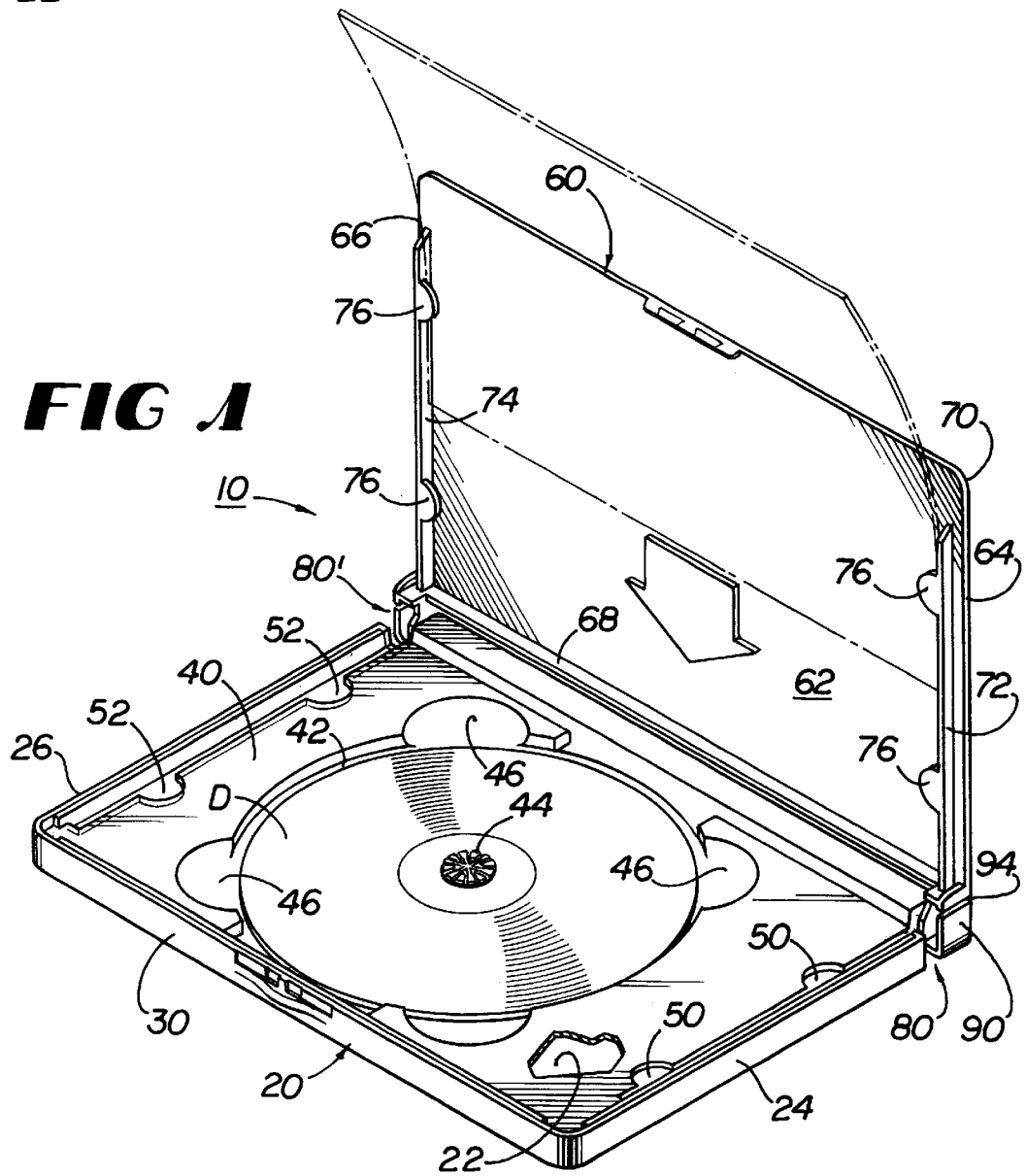

HINGE

BACKGROUND

The proliferation of new information exchange media continues. Only a decade ago, the expense of a digital compact disc player and the relatively few audio selections available on compact disc ("CD") made that particular information exchange media a novelty enjoyed only by the well-heeled audiophile. Today, the predecessor of the compact disc, the magnetic cassette tape, is viewed with disdain as an inferior means for storing, transferring and enjoying audio information. Cassette tapes and cassette tape players have been all but replaced in the home, car and on the waists of joggers by relatively inexpensive CD players. The switch to the CD as the information exchange media of choice is not limited to the latest music. CDs are now commonly utilized to transfer information ranging from computer software to information databases to "books on tape."

As the advent of the CD has already revolutionized the transfer of information in the audio and computer readable contexts, the CD will soon revolutionize the method by which conventionally videotaped information is stored, transferred and enjoyed. In fact, many video rental stores now offer parallel video selections in digital video disc ("DVD") format, signaling the beginning of the end for conventional videotape rentals.

Driving this transition is the basic fact that conventional magnetic tapes, such as cassette tapes and videotapes, have limited lifespans. As these devices are played and the information extracted therefrom, the tape which stores the information is pulled, stretched, placed in frictional contact with an audio head or video head and, eventually, weakened to the point of failure. Accordingly, devices for protecting and transporting these tapes need only be constructed for the purpose of surviving the limited life expectancy of the tape.

CDs, in contrast, boast no ascertainable lifespan limitations. In fact, media contained on such properly maintained discs may be accessed an infinite number of times without the slightest noticeable degradation of the quality of the information retrieved. The single most important factor in preserving such CDs is the proper handling and maintenance of the CD by the user.

Purchasers of CDs who intend to use the discs for their own personal purposes over an extended period of time will normally exercise a reasonable amount of caution in removing, using and storing the CD from and to its storage container. However, those who rent such CDs for a matter of days, only to eventually return the discs, often have little concern for the long term well-being of the CD. Such lack of concern could lead to any of a number of possible "injuries" to the disk, including warping, scratching or even breaking.

In the rental industry, where discs have begun to appear and will soon be standard, the challenge to maintain the well-being of the fragile disc is apparent. In particular, the disc manufacturing and rental industries have both attempted to develop a storage and transportation container for discs which will withstand substantial wear and tear. This wear and tear begins at the storage container production facility where the typical disc storage container, or parts thereof, are bent somewhat so that the container may be assembled. Thereafter, the sources of wear and tear and more obvious. Specifically, disc storage cases are opened and closed many thousands of times, inadvertently dropped on the floor, intentionally dropped in disc "drop slots" at the rental center and are, furthermore, subjected to a wide range of other abuses limited only by the imagination.

Accordingly, there is a need for a disc storage container which is more resilient to forces, both intended and unintended, applied to the container during assembly and use. There is also a need in the art for a disc storage container that affords increased ease of use in terms of its ability to deliver both the enclosed disc and related textual or graphic materials.

SUMMARY OF THE INVENTION

The present invention meets the needs described above by providing an improved hinge for hingedly interconnecting the cover of the container to the base of a container for storing and transporting media such as CDs. The present invention meets the needs of the disc rental industry and resolves the above-identified needs by providing a disc storage container featuring an improved hinge. Implementation of the improved hinge provides greater ease of assembly of the container and increased durability during use. Meeting these above-indicated needs results in easily recognizable economic advantages. Specifically, a sturdier and easier to use container will break less often, need to be replaced less often will put the CD within the container in jeopardy of damage less often. In a common retail rental environment, where thousands of disks are maintained in a rental inventory, the savings are significant.

More specifically, the container comprises a base tray and a cover. Within the base tray, a disc tray for mounting a disc is fixedly positioned. The cover of the container contains, on one side, two respective male portions of the improved hinge, which male portions mate with female portions defined within a corresponding position on the base tray. Additionally, the inside top surface of the cover contains integrally formed tab rails containing integrally formed, inward facing retaining tabs. The retaining tabs, positioned on the side of the respective tab rails so as to face the center of the inside top surface of the cover, are sized, spaced and otherwise positioned to slidably capture enclosed matter such as a card, pamphlet or other material intended for distribution with the disc.

The male portions of the hinge are flexible enough to withstand outward bending during assembly of the cover to the base and other various forces that could be exerted on the hinge during normal (and most abnormal) use. Importantly, the hinge is constructed to allow necessary and expected flexibility through a predetermined range of motion, the hinge being constructed to stop this movement after the hinge has reached this acceptable bending limit. Additionally, the retaining tabs are positioned within the inside top surface of the cover so as to minimize the interference of either the retaining tabs, tab rails or enclosed matter with the smooth operation and complete closing of the container, as has long been a recognized shortcoming with other widely used designs.

BRIEF DESCRIPTION OF THE DRAWINGS

FIG. 1 is a perspective view of an exemplary embodiment of the present invention including an improved hinge.

FIG. 2 is an exploded view of an embodiment of the present invention.

DETAILED DESCRIPTION

Figure 3A:
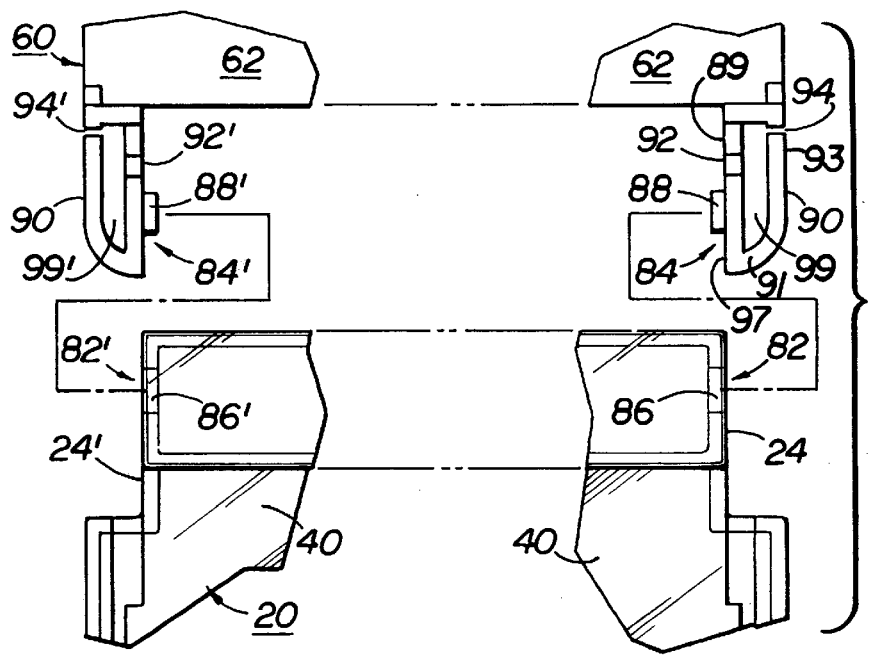
FIGS. 3A, 3B and 3C are sequential consecutive views of an exemplary implementation of an exemplary embodiment of the present invention.

Referring now to the drawings, FIG. 1 illustrates a preferred embodiment of the present invention. Generally, FIG.

1 depicts a container 10 for storing and transporting a disc such as a CD, DVD or the like (not shown).

As can be seen in FIG. 1, the container 10 comprises a base tray 20, a disk tray 40, a cover 60 and a pair of hinges 80' and 80. Generally, the disk tray 40 is captively received within the base tray 20. The base tray 40 and the cover 60 are pivotally interconnected by the hinges 80' and 80.

More specifically, the base tray 20 comprises an inside bottom surface 22 from which two side walls 24, 26, a rear wall 28 and a front wall 30 extend upwardly. At the end of each side wall 24, 26 adjacent to the rear wall 28 (FIG. 2) ("rear corners"), the distance between the side walls 24, 26 is reduced compared to the distance between the side walls 24, 26 adjacent to the front wall 30 ("front corners"). This bilateral reduced distance defines, at each rear corner, a notch for receiving a corresponding portion of the hinge 80' or 80.

The disk tray 40 is removably captured within the base tray 20. As is well known in the art, the disk tray 40 comprises a circular center surface 42 and a mounting hub 44 integrally formed with the center surface 42 for engaging a centralized hole of a disc (not shown). About the periphery of the circular center surface 42 are recesses 46 for removal access to the disc. Tab recesses 50, 52 are disposed along the respective edges of the disk tray 40 adjacent to the side walls 24, 26 of the base tray 20.

Still referring to FIG. 1, the cover 60 comprises a planar inside top surface 62 having a pair of downwardly extending side walls 64, 66 and a downwardly extending front wall 70. Parallel to each side wall 64, 66, integral to each of a pair of tab rails 72, 74, are inwardly directed tabs 76, each tab being substantially parallel to the plane of the inside top surface 62 and substantially perpendicular to the plane of the tab rails 72, 74.

Figure 4:
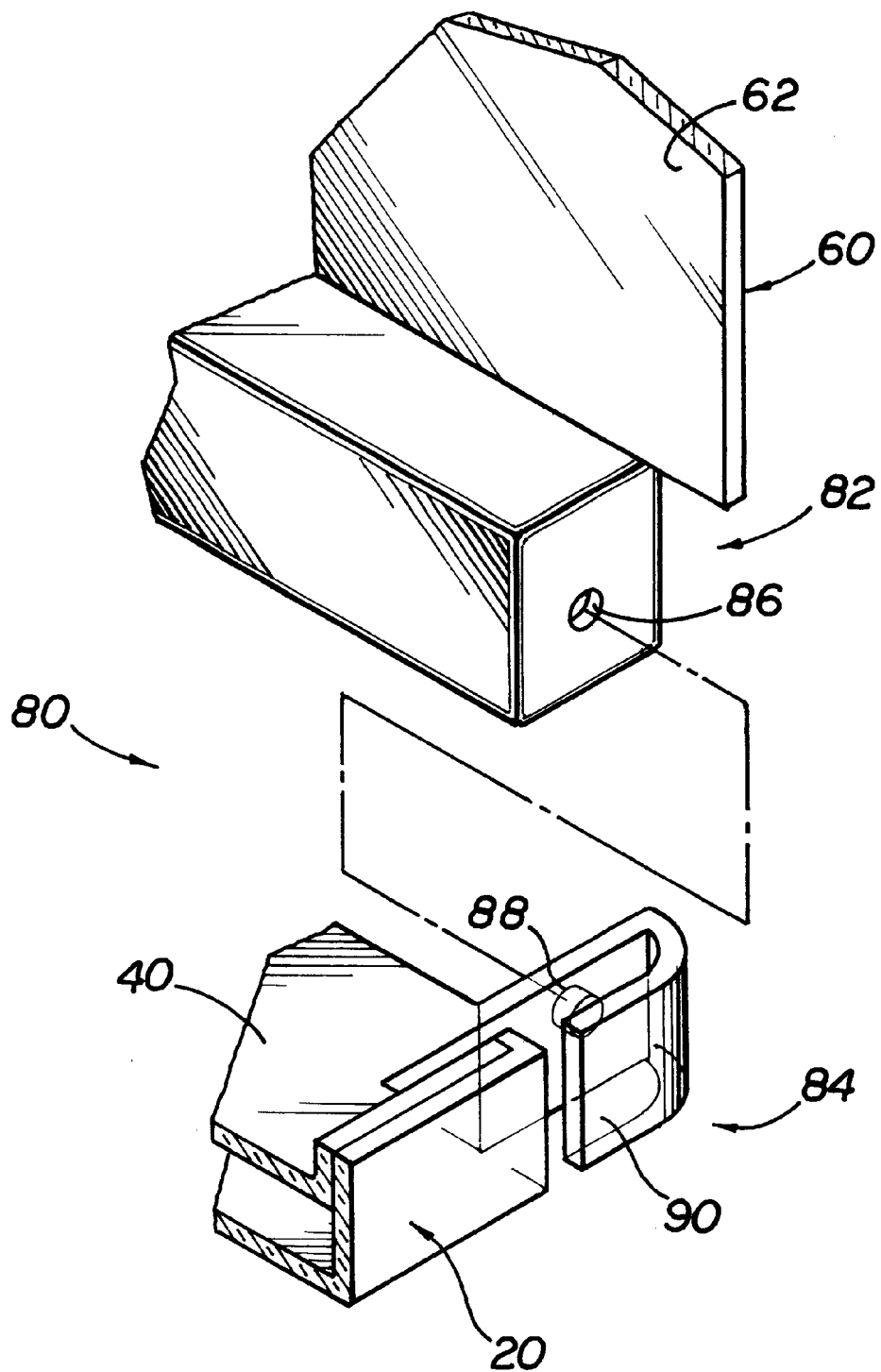
FIG. 4 is an exploded view of an alternative embodiment of the present invention.

The cover 60 is pivotally connected to the base tray 20 by a pair of hinges 80' and 80, one hinge being positioned at adjacent back corners of the container 10. Each hinge 80' and 80 comprises a male portion 84 and a female portion 82, the respective male and female portions of the hinge interconnecting in a "post/hole" arrangement. As illustration, FIG. 2 depicts the female portion 82 of the hinge 80 integral to the base tray 20 and the male portion 84 integral to the cover 60. FIG. 4 depicts the reverse arrangement, namely, the male portion 84' of the hinge 80 integral to the base tray 20 and the female portion 82 integral to the cover 60. Further description of the hinges 80' and 80 will be made with reference to the embodiment depicted in FIG. 2, although it will be understood and appreciated that such description is equally applicable to the embodiment depicted in FIG. 4.

Referring now to FIG. 2, a pivotable hinge 80 for interconnecting the cover 60 and the base tray 20 is shown with the female portion 82 separated from the male portion 84. In the embodiment depicted in FIG. 2, the side wall 24 of the base tray 20 defines a notch for receiving a corresponding male hinge portion 84. The portion of the side wall 24 defining the side of the notch adjacent to the back wall 28 defines, through its thickness, an aperture 86 for receiving the post-type nipple 88 of the male portion 84.

The male portion 84 of the hinge 80 is integral to the inside top surface 62 of the cover 60. The male portion 84 comprises, generally, an outside wall 90, housing first end 91 and second or outer end 93 an inside wall 92 having first end 89 and second or outer end 97 and a nipple 88. The outside wall 90 is a planar continuation of the respectively downwardly extending side wall 64. Importantly, although the outside wall 90 is a planar continuation of wall 64, it is not a continuous continuation. Rather, a terminating point of the downwardly extending side wall 64 of the cover 60 and the second or outer end 93 of the outside wall 90 define a gap 94 an expansion therebetween. In other words, it could be said that the expansion gap 94 passes through the width of the outside wall 90. Although the gap 94 is depicted in a particular location on the planar continuum between the downwardly extending side wall 64 of the cover 60 and the outside wall 90, it will be appreciated that the gap 94 could be positioned at virtually any point in the aforementioned continuum. Simply, the gap 94 appears between the outer end 93 of the outside wall 90 and the back wall 68 of the cover.

The inside wall 92 lies in a plane parallel to the outside wall 90, as also depicted in FIG. 2. The inside wall 92 and outside wall 90 are connected by an integrally formed turn portion between the two, the turn portion being the first end 91 of the outside wall 90.

The nipple 88 is integral to a side of the inside wall 92 such that it extends away from the outside wall 90 in a plane perpendicular to the planes of the respective walls. Additionally, the nipple 88 corresponds in size, shape and location to the aperture 86 within the side wall 24 of the female portion 82. When the nipple 88 resides within the aperture 86, the inside wall 92 of the male portion 80 rotates axially about the nipple 88 in a parallel planar arrangement with the inside wall 24 of the female portion 82 to move the cover 60 of the container 10 between an open and a closed position.

The second end 97 of the inside wall 92 is connected to the first end 91 (turn portion) of the outside wall 90. The inside and outside walls 90, 92 are laterally displaced from one another, thereby defining an opening 99 therebetween.

Figure 3B:
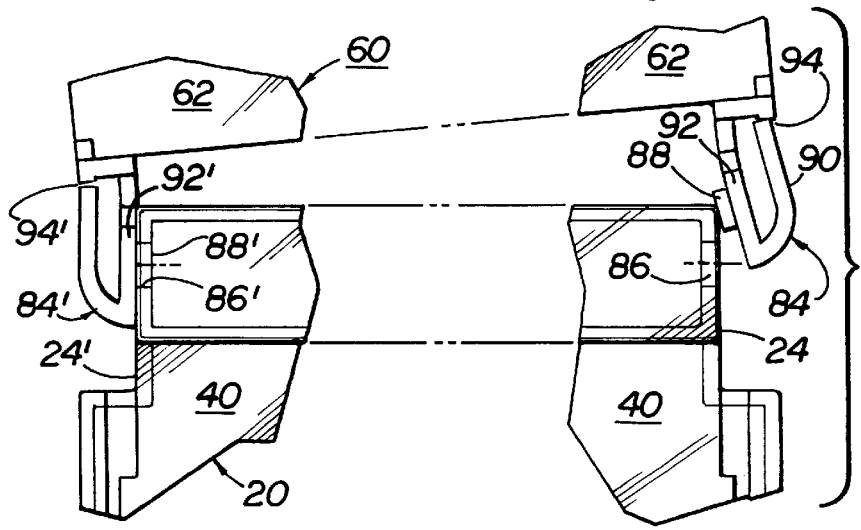
Figure 3C:
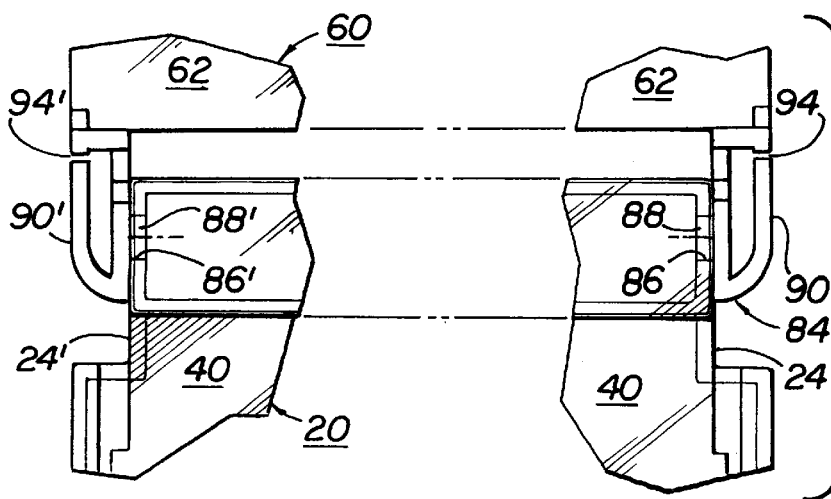

Referring now to FIGS. 3A–3C, a beneficial aspect of the present invention is shown in the assembly of the base 20 to the cover 60 of the container 10. First referring to FIG. 3A, the cover 60 is depicted in a detached state from the base 20. To attach the cover 60 to the base 20, an inside wall 92' of a first male portion 84' is bent as depicted in FIG. 3B. Importantly, as the first male portion 84' is bent outwardly, the gap 94' through the rigid outside wall 90' decreases in width until no gap remains because the respective wall portions defining the gap are in contact. This effectively prevents "overbending" of the male portion 84'. The attachment procedure continues with the nipple 88' being placed within the aperture 86', the configuration depicted in FIG. 3B as "88'/86'".

Still referring to FIG. 3B, attachment of the cover 60 to the base 20 is completed by bending the inside wall 92 of the male member 84 so that the gap 94 through the outside wall 90 is reduced or eliminated, then sliding the nipple 88 across the side wall 24 of the base 20 until the nipple 88 is seated within the aperture 86.

As shown in FIG. 3B, the outside wall 90 remains rigid while the inside wall 92, commonly referred to as being flexibly resilient, is bending.

FIG. 3C depicts the connective relation between the cover 60 and the base 20 after attachment is complete. Specifically, the resilient nature of the well known components used to make the cover 60 result in each male member 84' and 84 returning to its original, pre-bent shape after the nipples 88' and 88 are seated within their respective apertures 86' and 86. Accordingly, the respective gaps 94' and 94 remain through the thickness the respective outside wall 90' and 90 as before assembly began.

I claim:

1. A container adapted to hold an object such as a disk, the container comprising:
   a base tray including
     an inside bottom surface,
     a pair of side walls protruding upwardly from the inside bottom surface,
     a rear wall extending upwardly from the inside bottom surface,
     a front wall extending upwardly from the inside bottom surface,
     a disk tray for mounting the disk, the disk tray comprising:
       a recessed surface for securing the disk including
         a centralized, substantially circular center surface,
         a mounting hub integrally formed with the center surface for engaging a centralized hole of the disk, and
         disk tray fastening means for fastening the disk tray into the base tray; and
   a cover including
     an inside top surface,
     a pair of parallel side walls protruding downwardly from the inside top surface,
     a pair of tab rails, parallel to the side walls and protruding downwardly from the inside top surface, the tab rails each including a tab in a plane perpendicular to the respective tab rails and co-planar with the inside top surface, the tabs positioned on the side of the tab rails opposite the parallel side walls, and
     a front wall extending downwardly from the inside top surface, and
   a hinge for hingedly connecting the cover to the base tray, the hinge having two male portions and two female portions;
     the male portions being integrally formed with the cover, each male portion extending from adjacent corners of the cover in the same direction, the male portions being substantially co-planar with the cover, each male portion comprising:
       an inside wall and an outside wall, a first end of the inside wall connecting to the back wall of the cover, the inside wall extending outward from the back wall of the cover and a second end of the inside wall connecting to a turn portion of the outside wall, and the outside wall extending inward toward the back wall of the cover to define an expansion gap between an outer end of the outside wall and the back wall of the cover, wherein the outward bending of the male portion at least narrows the gap between the outer end of the outside wall and the back wall of the cover,
         the inside wall parallel to the outside wall and positioned so as to define an opening between the inside wall and outside wall, and
         a nipple on a side of the inside wall facing an opposing nipple and inside wall of the opposing male portion, the nipple corresponding in size, shape and location to a receiving aperture in the female portion,
     the female portions being integral to the base tray, each female portion defining an aperture through the side wall of the base tray for rotatably capturing the nipple from the respective male portion of the hinge.

2. A container for holding an object, the container comprising:
   a base tray;
   a cover; and
   a hinge for hingedly connecting the cover to the base tray, the hinge having two finitely bendable opposing male portions and two corresponding female portions;
     the finitely bendable opposing male portions extending in parallel from adjacent corners of the cover, the finitely bendable opposing male portions being co-planar with the cover, each finitely bendable opposing male portion comprising:
       an inside wall and an outside wall, a first end of the inside wall connecting to the cover, the inside wall extending outward from the cover and a second end of the inside wall connecting to a turn portion of the outside wall, and the outside wall extending inward toward the cover, the outside wall further defining an expansion gap through the thickness of its width wherein the outward bending of the male portion at least narrows the gap relative to the cover,
         the inside wall parallel to the outside wall and positioned so as to define an opening between the inside wall and outside wall, and
         a nipple on a side of the inside wall facing an opposing nipple and an opposing inside wall of the opposing finitely bendable male portion, the nipple corresponding in size, shape and location to a receiving aperture in the corresponding female portion,
     the female portions being integral to the base tray, each female portion defining an aperture through the side wall of the base tray for rotatably capturing the nipple from the respective male portion of the hinge.

3. A container for holding an object, the container comprising:
   a base tray;
   a cover; and
   a hinge for hingedly connecting the cover to the base tray, the hinge comprising two finitely bendable opposing portions and two corresponding rigid portions;
     the finitely bendable opposing portions each comprising:
       an outside wall,
       an inside wall coupled to the outside wall and one of the base tray and cover, an opening defined between the inside and outside walls, an outer end of the outside wall extending inward from the inside wall toward the one of the base tray and cover, the outside wall defining a gap between the outer end of the outside wall and the one of the base tray and cover wherein the outward bending of the opposing portion at least narrows the gap between the outer end of the outside wall and the one of the base tray and cover, and
       a nipple on a side of the inside wall facing an opposing nipple and an opposing inside wall of the opposing finitely bendable portion.

4. The container recited in claim 3, wherein the finitely bendable portion is integral to the base tray.

5. The container recited in claim 3, wherein the finitely bendable portion is integral to the cover.

6. A hinge for detachably connecting a base tray and a cover together to form a container adapted to hold an object, the hinge comprising a male portion and a corresponding female portion, the female portion defined by one of the base tray and the cover, the male portion extending from the other of the base tray and the cover and comprising an inside wall and an outside wall, the inside wall having an outer end and outwardly extending from the other of the base tray and the cover, the outside wall having an outer end and a turn portion, the turn portion extending from the outer end of the inside wall, and the outer end of the outside wall extending inward toward the other of the base tray and the cover to define a gap between the outer end of the outside wall and the other of the base tray and the cover wherein the outward bending of the male portion at least narrows the gap between the outer end of the outside wall and the other of the base tray and the cover.

7. The hinge of claim 6 wherein the inside wall outwardly extends from the base tray and the outside wall extends inward toward the base tray.

8. The hinge of claim 6 wherein the inside wall outwardly extends from the cover and the inside wall extends inward toward the cover.

9. The hinge of claim 6 wherein the inside wall is rigid and the outside wall is flexibly resilient.

10. The hinge of claim 8 wherein the outside wall extending toward the one of the base tray and the cover defines a gap between the outer end of the outside wall and the one of the base tray and the cover.

11. The hinge of claim 10 wherein the outward bending of the male portion at least narrows the gap between the outer end of the outside wall and the one of the base tray and the cover.

12. The hinge of claim 6 wherein said inside wall, outside wall, and the turn portion of the inside wall substantially defines a U-shaped male portion.

13. The hinge of claim 8 wherein the female portion is substantially defined by a recessed corner in the base tray.

* * * * *